United States Patent
Liang

(10) Patent No.: US 11,025,323 B2
(45) Date of Patent: Jun. 1, 2021

(54) APPARATUS AND METHOD FOR CONTROLLING TRANSMISSION IN A COMMUNICATION SYSTEM

(71) Applicant: NEC Corporation, Tokyo (JP)

(72) Inventor: Caroline Liang, Guildford (GB)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/666,526

(22) Filed: Oct. 29, 2019

(65) Prior Publication Data

US 2020/0052764 A1 Feb. 13, 2020

Related U.S. Application Data

(63) Continuation of application No. 16/002,083, filed on Jun. 7, 2018, now Pat. No. 10,511,371, which is a (Continued)

(30) Foreign Application Priority Data

Apr. 4, 2013 (GB) .................................. 1306100

(51) Int. Cl.
*H04W 24/10* (2009.01)
*H04B 7/06* (2006.01)
(Continued)

(52) U.S. Cl.
CPC .......... *H04B 7/0626* (2013.01); *H04B 7/024* (2013.01); *H04B 7/0619* (2013.01); *H04B 7/04* (2013.01); *H04W 84/042* (2013.01)

(58) Field of Classification Search
None
See application file for complete search history.

(56) References Cited

U.S. PATENT DOCUMENTS 9,119,209 B2 8/2015 Nam et al.
2007/0191020 A1 8/2007 Fischer et al.
(Continued)

FOREIGN PATENT DOCUMENTS

CN 101127543 A 2/2008
CN 101379730 A 3/2009
(Continued)

OTHER PUBLICATIONS

International Search Report for PCT Application No. PCT/JP2014/059904, dated Aug. 5, 2014.
(Continued)

*Primary Examiner* — Ayanah S George

(57) ABSTRACT

The invention provides a communication system and components thereof for controlling coordinated transmissions using a plurality of carriers operated by a plurality of transmission points. A transmission point configures a number of signal quality and interference measurements for a mobile telephone communicating over the plurality of carriers, each measurement being associated with multiple carriers and multiple measurement configurations. The mobile telephone performs the configured measurements with respect to each of the multiple carriers and reports the results of the relevant measurements to the transmission point.

16 Claims, 7 Drawing Sheets

Related U.S. Application Data continuation of application No. 14/768,513, filed as application No. PCT/JP2014/059904 on Mar. 28, 2014, now Pat. No. 10,003,391.

(51) Int. Cl.
| | | |
|---|---|---|
| *H04B 7/024* | (2017.01) | |
| *H04B 7/04* | (2017.01) | |
| *H04W 84/04* | (2009.01) | |

(56) References Cited

U.S. PATENT DOCUMENTS

| | | | |
|---|---|---|---|
| 2008/0039131 | A1 | 2/2008 | Kaminski et al. |
| 2012/0120842 | A1 | 5/2012 | Kim et al. |
| 2013/0021925 | A1 | 1/2013 | Yin et al. |
| 2013/0039231 | A1 | 2/2013 | Wang |
| 2013/0148515 | A1* | 6/2013 | Ribeiro ............ H04L 5/0048 370/252 |
| 2013/0258964 | A1 | 10/2013 | Nam et al. |
| 2013/0258973 | A1 | 10/2013 | Khoshnevis et al. |
| 2013/0301450 | A1 | 11/2013 | Geirhofer et al. |
| 2013/0301548 | A1* | 11/2013 | Etemad ............. H04L 69/22 370/329 |
| 2014/0112173 | A1* | 4/2014 | Hammarwall ...... H04L 1/0026 370/252 |
| 2014/0126496 | A1 | 5/2014 | Sayana et al. |
| 2014/0177601 | A1 | 6/2014 | Nishio et al. |
| 2014/0177744 | A1 | 6/2014 | Krishnamurthy et al. |
| 2015/0264694 | A1 | 9/2015 | Nagata et al. |

FOREIGN PATENT DOCUMENTS

| | | |
|---|---|---|
| CN | 101400135 A | 4/2009 |
| EP | 2642674 A2 | 9/2013 |
| JP | 2014-075676 A | 4/2014 |
| WO | 2011/013989 A2 | 2/2011 |
| WO | 2012/067442 A2 | 5/2012 |
| WO | 2012/094608 A2 | 7/2012 |
| WO | 2012/111807 A1 | 8/2012 |
| WO | 2013/018831 A1 | 2/2013 |
| WO | 2013/021531 A1 | 2/2013 |
| WO | 2013/021556 A1 | 2/2013 |
| WO | 2013/025558 A1 | 2/2013 |
| WO | 2013/170202 A1 | 11/2013 |
| WO | 2014/129858 A1 | 8/2014 |

OTHER PUBLICATIONS

3rd Generation Partnership Project;Technical Specification Group Radio Access Network; Coordinated multi-point operation for LTE physical layer aspects (Release 11), 3GPP TR 36.819 V11.1.0 (Dec. 2011), Cited in the Specification.

3rd Generation Partnership Project;Technical Specification Group Radio Access Network; Evolved Universal Terrestrial Radio Access (E-UTRA); Physical layer procedures (Release 11), 3GPP TS 36.213 V11.1.0 (Dec. 2012), Cited in the Specification.

Renesas et al., "WF on Interference Averaging for CSI-IM", 3GPP TSG RAN WG1 #71, Nov. 2012, R1-125370, Agenda item: 6.2.2.4, New Orleans, USA, Cited in the Specification.

Renesas Mobile Europe Ltd., "On CQI definition", 3GPP TSG-RAN WG1 Meeting #71, Nov. 2012, R1-125051, Agenda item 6.2.2.5, New Orleans, USA, Cited in the Specification.

3rd Generation Partnership Project;Technical Specification Group Radio Access Network; Evolved Universal Terrestrial Radio Access (E-UTRA); Physical layer procedures (Release 11), 3GPP TS 36.213 V11.2.0 (Feb. 2013), Cited in the Specification.

3rd Generation Partnership Project; Technical Specification Group Radio Access Network; Evolved Universal Terrestrial Radio Access (E-UTRA); Physical Channels and Modulation (Release 11), 3GPP TS 36.211 V11.2.0 (Feb. 2013), Cited in the Specification.

Fujitsu, "Email discussion [69-10]: Details of collision handling and compression/multiplexing in case of 2 or more CSIs being configured in the same reporting instance for CoMP CSI feedback", 3GPP TSG RAN WG1 Meeting #70, Aug. 2012, R1-123295 draft, Agenda Item: 7.5.1.3.1, Qingdao, China.

Alcatel-Lucent, "The constraints of CSI processes for CoMP", 3GPP TSG RAN WG1 meeting #70bis, Oct. 2012, R1-124411, Agenda Item: 7.4.2, San Diego, USA.

Samsung, "CSI test cases design for Downlink CoMP", 3GPP TSG-RAN WG4 Meeting #66, Jan. to Feb. 2013, R4-130318, Agenda item: 6.12.4, Malta, Malta.

NEC Group, "Discussion on interference measurement for CoMP", 3GPP TSG RAN WG1 Meeting #68b, Mar. 2012, R1-121333, Agenda item: 7.5.2, Jeju, Korea.

Japanese Office Action for JP Application No. 2015-542502 dated Sep. 14, 2016 with English Translation.

Japanese Office Action for JP Application No. 2015-542502 dated May 10, 2017 with English Translation.

DL CoMP Rapporteur (Samsung), "RRC Parameters for Downlink CoMP", 3GPP TSG RAN WG1 #70bis, Oct. 2012, Chapter 2.2, R1-124669, Agenda item: 7.4.1, San Diego USA, Cited in JPOA.

Samsung (rapporteur), "Email discussion report on [79b#34][LTE/COMP] CoMP Open issues", 3GPP TSG-RAN WG2#80 meeting, Nov. 2012, Chapter 2.4, R2-125718, Agenda Item: 7.7.1, New Orleans, USA, Cited in JPOA.

Communication dated Apr. 23, 2019 by the Japanese Patent Office in application No. 2018-030418 with English Translation.

NEC Group, "ZP-CSI-RS Configuration for IMRs and PDSCH RE matching", 3GPP TSG-RAN WG1 Meeting #71, R1-124849, Nov. 12-16, 2012, pp. 1-4.

Samsung, "CRS RE assumption for TM10 CSI reporting", 3GPP TSG-RAN WG1#72 meeting, R1-130275, Jan. 28-Feb. 1, 2013, pp. 1-4.

Renesas Mobile Europe Ltd, "Details of CRS rate matching and quasi-colocation signaling", 3GPP TSGRAN WG1 Meeting #70bis, R1-124392, Oct. 8-12, 2012, pp. 1-3.

ZTE, "Remaining details on PDSCH rate matching behavior", 3GPP TSG-RAN WG1 Meeting #71, R1-125249, Nov. 12-16, 2012, pp. 1-3.

3rd Generation Partnership Project; Technical Specification Group Radio Access Network; Evolved Universal Terrestrial Radio Access (E-UTRA); Radio Resource Control (RRC); Protocol specification; (Release 11); Technical Specification; 3GPP TS 36.331; V11.3.0; https://www.3gpp.org/ftp/Specs/archive/36_series/36.331/36331-b30.zip; pp. 1-344; dated Mar. 2013.

Chinese Office Action for Chinese Application No. 201810799307.0 dated Dec. 3, 2020 with English Translation.

New Postcom, "Enhanced Interference measurement for CoMP", 3GPP TSG RAN WG1 Meeting #66bis, R1-112991, Oct. 14, 2011, pp. 1-3.

\* cited by examiner

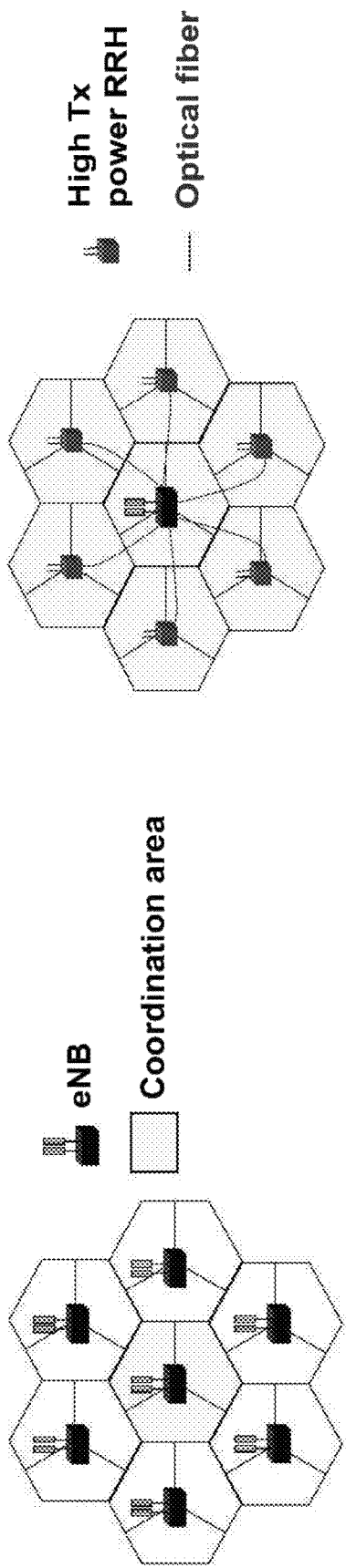
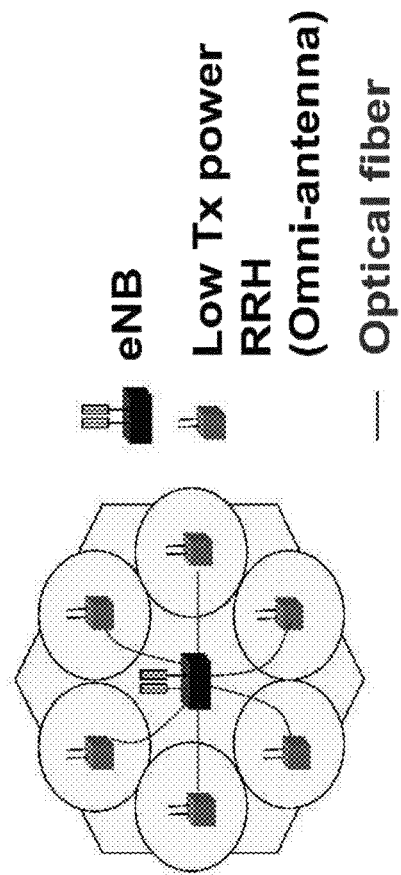
Figure 3a
Figure 3b
Figure 3c

APPARATUS AND METHOD FOR CONTROLLING TRANSMISSION IN A COMMUNICATION SYSTEM

CROSS-REFERENCE TO RELATED APPLICATIONS

The present application is a Continuation application of Ser. No. 16/002,083 filed on Jun. 7, 2018, which is a Continuation Application of Ser. No. 14/768,513 filed on Aug. 18, 2015, U.S. Pat. No. 10,003,391 issued on Jun. 19, 2018, which is a National Stage Entry of International Application PCT/JP2014/059904 filed on Mar. 28, 2014, which claims the benefit of priority from United Kingdom Patent Application 1306100.7, filed on Apr. 4, 2013, the disclosures of all of which are incorporated in their entirety by reference herein.

TECHNICAL FIELD

The present invention relates to a communication system and to components thereof for providing communication services to mobile or fixed communication devices. The invention has particular, but not exclusive, relevance to cell signal measurements and channel state information reporting in Long Term Evolution (LTE) Advanced systems as currently defined in associated 3rd Generation Partnership Project (3GPP) standards documentation.

BACKGROUND ART

In a cellular communications network, user equipment (UE) (such as mobile telephones, mobile devices, mobile terminals, etc.) can communicate with other user equipment and/or remote servers via base stations. LTE systems include an Evolved Universal Terrestrial Radio Access Network (E-UTRAN) and an Evolved Packet Core (EPC) network (or simply 'core network'). The E-UTRAN includes a number of base stations ('eNBs') for providing both user-plane (e.g. Packet Data Convergence Protocol (PDCP), Radio Link Control (RLC), Medium Access Control (MAC) and PHYsical (PHY) layers) and control-plane (e.g. Radio Resource Control (RRC)) protocol terminations towards the UE.

Depending on various criteria (such as the amount of data to be transmitted, radio technologies supported by the mobile telephones, expected quality of service, subscription settings, etc.), each base station is responsible for controlling the transmission timings, frequencies, transmission powers, modulations, etc. employed by the mobile telephones attached to the base station. In order to minimise disruption to the service and to maximise utilisation of the available bandwidth, the base stations continuously adjust their own transmission power and also that of the mobile telephones. Base stations also assign frequency bands and/or time slots to mobile telephones, and also select and enforce the appropriate transmission technology to be used between the base stations and the attached mobile telephones. By doing so, base stations also reduce or eliminate any harmful interference caused by mobile telephones to each other or to the base stations.

In order to optimise utilisation of their bandwidth, LTE base stations receive periodic signal measurement reports from each served mobile telephone (based on measurement configurations provided by the E-UTRAN), which include information about the perceived signal quality on a given frequency band used by (or being a candidate frequency band for) that mobile telephone. The served mobile telephones carry out measurements on reference signals that are transmitted at a known (non-zero) power level. By comparing the received power level to the reference power level, they are able to establish a measure of the signal degradation between the base station transmitting and the mobile telephone receiving the signal. On the other hand, interference is usually measured on resource blocks where transmissions of the serving base station are muted (i.e. set to zero power). That way, any signal that can be detected by the mobile telephone whilst the base station is known to transmit at zero power can be classified as interference caused by other transmitters operating in the same frequency band (e.g. neighbouring base stations and/or other mobile telephones). Depending on the measurement configurations (which are provided by the E-UTRAN), the mobile telephones generate and send measurement reports to their serving base stations. The measurement reports may be sent either periodically or when predefined events occur (e.g. interference gets higher than a predetermined threshold, signal quality falls below a predetermined level, etc).

These signal measurement reports are then used by the base stations in their decision to allocate certain parts of their bandwidth to the served mobile telephones and/or to adjust their transmission power and/or to hand over mobile telephones to other base stations (or other frequency bands/other radio access technologies (RATs)) when the signal quality does not meet the established criteria. The handing over of a mobile telephone might be necessary, for example, when the mobile telephone has moved away from the given base station, and also when a signal quality/interference problem has arisen.

A so-called Downlink Coordinated Multi-Point (CoMP) transmission/reception feature was introduced in Rel-11 of the 3GPP standards documentation to improve, for example, the coverage of high data rates for user equipment, temporary network deployment, cell edge throughput and/or to increase system throughput. The CoMP feature established techniques for compatible mobile telephones (and other user equipment) to communicate with multiple transmission points (TPs), substantially simultaneously. The TPs typically include (any combination of) base stations (eNBs), remote radio heads (RRHs), relay nodes (RNs), and the like. These techniques are described in, for example, TR 36.819 V11.1.0, the contents of which are hereby incorporated by reference. In summary, CoMP may be used i) to optimise received signal quality at the mobile telephone by transmitting the same signal from multiple TPs and/or ii) to increase data throughput by sending different signals (e.g. different parts of the user data) from different TPs concurrently (but of course without causing interference, e.g. by using different frequencies/timing/codes/etc).

When multiple transmission points are used by the mobile telephone, it is configured to measure and report the quality of the signals transmitted by each transmission point and also to measure and report back any interference experienced so that each transmission point can adjust its operation accordingly (i.e. to be able to transmit at/near an optimum power level and to keep interference to a minimum). Since the mobile telephone in this case is located within the overlapping coverage areas (cells) of multiple transmission points, these transmission points need to coordinate the transmissions of their reference signals, in order to make it possible to carry out the above described signal quality and interference measurements. In particular, when CoMP is used, the different transmission points transmit their respective reference signals at different times (whilst the other transmission points are muted), one by one, so that signal quality can be measured effectively by the mobile telephone, for each transmission point. Additionally, in order for the mobile telephone to able to measure interference caused by other transmitters than the cooperating transmission points, the base stations need to be muted, temporarily, at the same time, at least for the duration of the mobile telephone's measurements. Thus, the number of measurements (to be configured for and performed by the mobile telephone) equals to the number of transmission points (each one being a hypothetical interfering TP) plus one (for determining interference caused by other transmitters).

In Release-11, downlink CoMP has been specified to allow multiple transmission points (e.g. base stations) to coordinate their downlink data transmissions. In order to support more efficient utilisation of the downlink resources, the mobile telephone may be configured to report channel state information (CSI) by measuring a set of non-zero power (NZP) reference signal (RS or CSI-RS) resources—this set is known as the CoMP measurement set. For example, the mobile telephone may carry out measurement of a reference signal received power (RSRP) and report the results of this measurement to the base station which in turn can use the measurement to adjust its operation and to manage the CoMP measurement set (e.g. to choose a CoMP measurement set for which CSI feedback is required). The maximum size of the CoMP measurement set is three NZP CSI-RS resources, selected from all possible CSI-RS resources (defined as a CoMP Resource Management Set).

The mobile telephone may also be configured to perform one or more interference measurements (CSI-IM). Each CSI-IM is associated with one interference measurement resource (IMR), which is a set of resource elements on which interference measurements can be made.

In a so-called 'CSI process', the E-UTRAN can request the mobile telephone to carry out a combined measurement on a NZP CSI-RS resource and on an IMR. The mobile telephone performs the combined measurements on resources indicated by the 'CSI process', and sends a so-called 'CSI report' to the E-UTRAN, which includes the results of the combined measurements. The mobile telephone can be configured to perform, in response to a given CSI process, periodic and/or aperiodic CSI reporting.

A new LTE transmission mode ('Transmission mode 10' or 'TM10') has also been defined in Rel-12 to provide support for CoMP functionalities. The relevant parameters of transmission mode 10 are defined in 3GPP TS 36.213 (v11.1.0), the contents of which are incorporated herein by reference. In particular, section 7.1 of TS 36.213 describes scrambling identities for UE-specific reference signal generation, supported DCI formats and transmission schemes. Section 7.2 describes that a mobile telephone in transmission mode 10 can be configured with one or more CSI processes per serving cell (by higher layers). Each CSI process is associated with a CSI-RS resource (defined in Section 7.2.5) and a CSI-interference measurement (CSI-IM) resource (defined in Section 7.2.6). A CSI reported by the mobile telephone corresponds to a CSI process configured by higher layers. Each CSI process can be configured with or without PMI/RI reporting by higher layer signalling.

In Rel-12, in order to enhance small cell performance, mechanisms for interference avoidance and coordination between macro and small cells as well as among small cells are currently being considered. However, since clusters of relatively small cells are typically denser than scenarios considered for the so-called Enhanced Inter-Cell Interference Coordination (enhanced ICIC or eICIC) technique in Rel-10, or for the so-called Further Enhanced ICIC (FeICIC) technique and CoMP in Rel-11, these techniques cannot be re-used without added complexity to the user equipment and/or transmission points.

Furthermore, the carrier aggregation (CA) feature defined for LTE-Advanced supports transmission bandwidths up to 100 MHz of spectrum by aggregating the resources of two or more component carriers. When carrier aggregation is used there are a number of serving cells, one for each component carrier. The radio resources connection is handled by one cell, the primary serving cell, served by the primary component carrier (PCC), whilst user data may be communicated via any of the component carriers, primary and/or any secondary component carrier (SCC). However, the effective coverage of and/or perceived signal qualities offered by the various serving cells may differ—either due to the different frequencies used in different cells or due to power planning considerations (and possibly other factors influencing propagation of transmitted signals). Therefore, the base station configures the mobile telephones it is serving via its component carriers to carry out and report predetermined signal quality and interference measurements (i.e. one or more CSI processes, depending on the number of cells to be measured) so that it can take appropriate corrective actions when signal degradation is experienced by user equipment within its cell(s).

3GPP has recently made a working assumption (at RAN1 meeting #71) that for the joint operation of downlink CoMP and CA, the UE capability for the number of supported CSI processes is defined as follows:

$P_{CSI}$ is the maximum number of CSI processes supported on a component carrier;

$P_{CSI}$ is provided per band combination;

The $P_{CSI}$ value applies to each component carrier within a band; and $P_{CSI}$ can take a value in $\{1,3,4\}$.

In this context, band combination refers to a collection of bands. Therefore, it can be seen that for a mobile telephone which is capable of performing up to a maximum of four simultaneous CSI processes in transmission mode 10 (for both single carrier operation and carrier aggregation), and assuming that there are five bands (component carriers) aggregated, this means that there is always at least one band in which the mobile telephone cannot process any CSI processes.

SUMMARY OF INVENTION

Technical Problem

In the case of joint CA and CoMP operation, the total number of CSI processes for CSI feedback is limited to five from all component carriers. This limitation was introduced in order to minimise the signalling needed between the base station and served user equipment and thereby ensure effective utilisation of the radio interface between them. However, since a maximum of five component carriers can be aggregated per transmission point, this limitation means that it is not always possible to support CoMP operation when two or more component carriers are configured. Even in the case of fewer than the maximum number of component carriers being configured, different CoMP schemes cannot always be supported simultaneously and/or adequately due to the limited number of CSI feedback processes that are available.

The present invention aims to provide an improved communication system and improved components of the communication system which overcome or at least alleviate one or more of the above issues. In particular, the invention aims to provide downlink (DL) CoMP CSI feedback and IMR mechanisms, improve support for simultaneous CoMP and CA, and/or for heterogeneous network (HetNet) services. The present invention also aims to reduce complexity of the user equipment and the number of CSI feedbacks required for CoMP.

Solution to Problem

In one aspect, the present invention provides a network node for controlling coordinated transmissions, in a communication system comprising at least one mobile device and a plurality of transmission points which operate at least one cell, the network node comprising: means for sending, to the at least one mobile device, a signalling message, the signalling message comprising CSI (Channel State Information) process data that indicates a plurality of combined measurements to be made by the mobile device, wherein the combined measurement is associated with a respective different configuration of the plurality of transmission points and the combined measurement comprises at least one signal quality measurement and at least one interference measurement for the associated configuration of the plurality of transmission points; and means for receiving, from the at least one mobile device, measurement results for a selected one of the plurality of combined measurements and data identifying which one of the plurality of combined measurements the results relate.

The combined measurement may identify: i) a first set of resource elements on which a signal quality measurement is to be carried out by the at least one mobile device; and ii) a second set of resource elements on which an interference measurement is to be carried out by the at least one mobile device. The first set of resource elements may comprise at least one NZP (non-zero power) resource element and the second set of resource elements comprises at least one ZP (zero-power) resource element.

The network node may further comprise means for configuring the plurality of transmission points in accordance with the CSI process data signalled to the mobile device.

The measurement results received from the at least one mobile device may comprise at least one of: a CQI (Channel Quality Indicator) a RI (Rank Indicator) and a PMI (Precoding Matrix Indicator).

The network node may further comprise means for controlling the coordinated transmissions, by the plurality of transmission points, in dependence upon the measurement results received from the at least one mobile device.

The data identifying which one of the plurality of combined measurements the results relates may comprise: data identifying the CSI process ('CSI process id') and data identifying at least one of a transmission point ('TP id') and an interference measurement resource ('IMR id').

The coordinated transmission points may be configured to coordinate transmissions in accordance with one or more communication modes selected from the group comprising: i) joint transmission (JT) mode in which multiple transmission points send data to the mobile device; ii) CS/CB (Coordinated Scheduling/Beam forming) mode in which the mobile device receives transmissions from one transmission point, and the transmission points coordinate their scheduling and/or beam forming decisions to minimise interference between the transmissions; and iii) DPS (Dynamic Point Selection) mode in which the mobile device receives transmissions from a transmission point selected from a set of coordinating transmission points.

At least one of the plurality of transmission points may be selected from a group comprising: i) a base station; ii) a RRH (remote radio head); and a RN (relay node). The network node may comprise a base station operating in accordance with the LTE (long term evolution) set of standards. At least two cells operated by the plurality of transmission points may be configured for CA (Carrier Aggregation).

The network node may further comprise means for generating the CSI process data.

In another aspect, the present invention provides a mobile device for a communication system providing coordinated transmissions via a plurality of transmission points which operate at least one cell, the mobile device comprising: means for receiving from a transmission point a signalling message, the signalling message comprising CSI (Channel State Information) process data that indicates a plurality of combined measurements to be made by the mobile device, wherein the combined measurement is associated with a respective different configuration of the plurality of transmission points and the combined measurement comprises at least one signal quality measurement and at least one interference measurement for the associated configuration of the plurality of transmission points; and means for sending, to a transmission point, measurement results for a selected one of the plurality of combined measurements and data identifying which one of the plurality of combined measurements the results relate.

The mobile device may further comprise a measurement module for obtaining signal quality measurements and interference measurements of signals received from different transmission points within the vicinity of the mobile device. The mobile device may further comprise means for configuring the measurement module in accordance with the CSI process data signalled by the transmission point.

The mobile device may be selected from a group comprising: i) a mobile telephone; ii) a mobile terminal; and iii) UE (user equipment).

In yet another aspect, the present invention provides a network node for controlling coordinated transmissions, in a communication system comprising at least one mobile device and a plurality of transmission points which operate at least one cell, the network node comprising transceiver circuitry for: sending, to the at least one mobile device, a signalling message, the signalling message comprising CSI (Channel State Information) process data that indicates a plurality of combined measurements to be made by the mobile device, wherein the combined measurement is associated with a respective different configuration of the plurality of transmission points and the combined measurement comprises at least one signal quality measurement and at least one interference measurement for the associated configuration of the plurality of transmission points; and receiving, from the at least one mobile device, measurement results for a selected one of the plurality of combined measurements and data identifying which one of the plurality of combined measurements the results relate.

In yet another aspect, the present invention provides a mobile device for a communication system providing coordinated transmissions via a plurality of transmission points which operate at least one cell, the mobile device comprising transceiver circuitry for: receiving from a transmission point a signalling message, the signalling message comprising CSI (Channel State Information) process data that indicates a plurality of combined measurements to be made by the mobile device, wherein the combined measurement is associated with a respective different configuration of the plurality of transmission points and the combined measurement comprises at least one signal quality measurement and at least one interference measurement for the associated configuration of the plurality of transmission points; and sending, to a transmission point, measurement results for a selected one of the plurality of combined measurements and data identifying which one of the plurality of combined measurements the results relate.

In yet another aspect, the present invention provides a method performed by a network node for controlling coordinated transmissions, in a communication system comprising at least one mobile device and a plurality of transmission points which operate at least one cell, the method comprising: sending, to the at least one mobile device, a signalling message, the signalling message comprising CSI (Channel State Information) process data that indicates a plurality of combined measurements to be made by the mobile device, wherein the combined measurement is associated with a respective different configuration of the plurality of transmission points and the combined measurement comprises at least one signal quality measurement and at least one interference measurement for the associated configuration of the plurality of transmission points; and receiving, from the at least one mobile device, measurement results for a selected one of the plurality of combined measurements and data identifying which one of the plurality of combined measurements the results relate.

In yet another aspect, the present invention provides a method performed by a mobile device for a communication system providing coordinated transmissions via a plurality of transmission points which operate at least one cell, the method comprising: receiving from a transmission point a signalling message, the signalling message comprising CSI (Channel State Information) process data that indicates a plurality of combined measurements to be made by the mobile device, wherein the combined measurement is associated with a respective different configuration of the plurality of transmission points and the combined measurement comprises at least one signal quality measurement and at least one interference measurement for the associated configuration of the plurality of transmission points; and sending, to a transmission point, measurement results for a selected one of the plurality of combined measurements and data identifying which one of the plurality of combined measurements the results relate.

The invention also provides a communication system comprising the above described network node and the above described mobile device.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Embodiments of the invention will now be described, by way of example only, with reference to the attached figures in which:

FIGS. 3a, 3b and 3c schematically illustrate different mobile telecommunication system scenarios having multiple, coordinated network transmission points;

DESCRIPTION OF EMBODIMENTS

Overview

Figure 1:
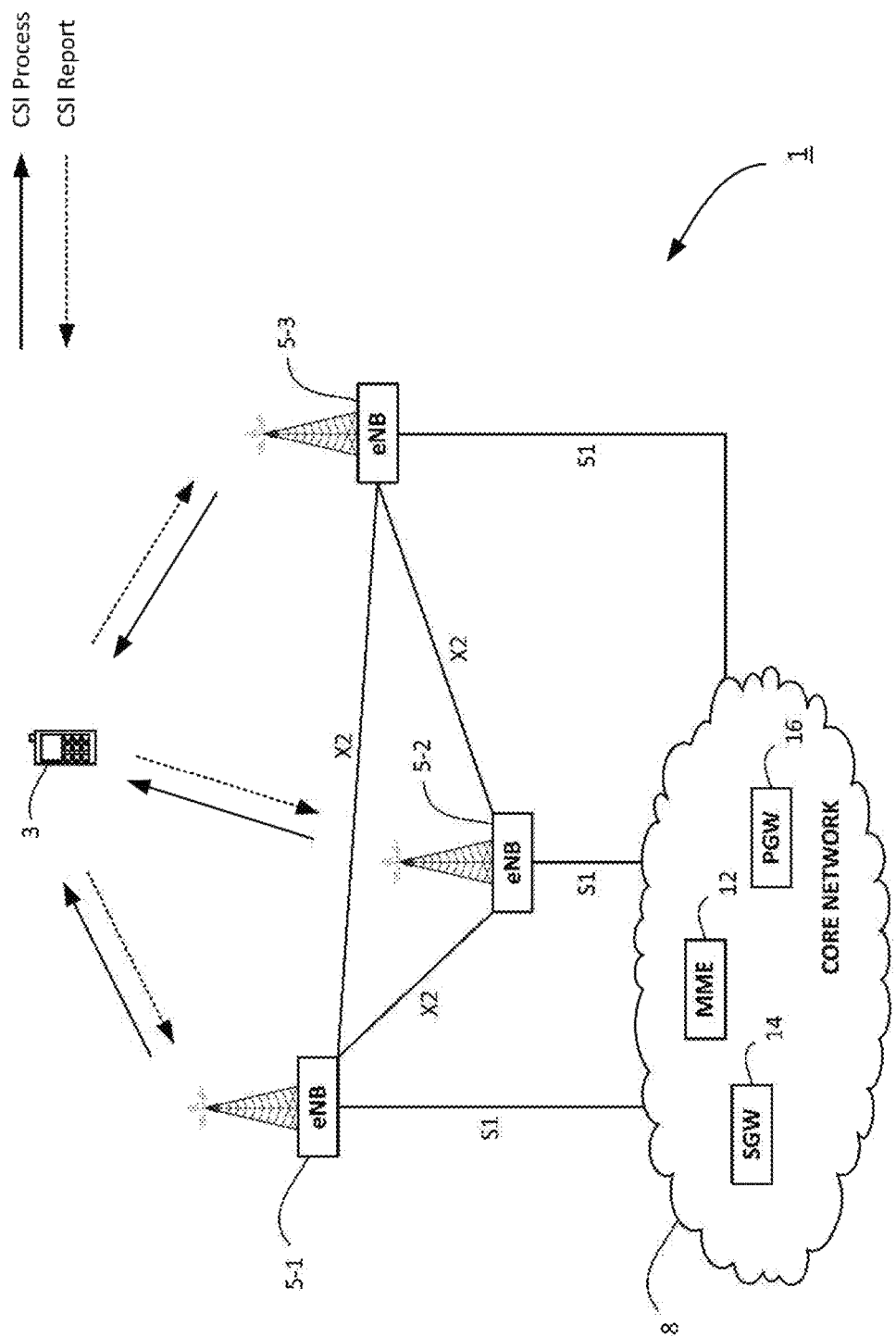
FIG. 1 schematically illustrates a mobile telecommunication system of a type to which the invention is applicable.

FIG. 1 schematically illustrates a mobile (cellular) telecommunication system 1 including a mobile telephone 3 (or other compatible user equipment) served via the cells of a plurality of base stations 5-1 to 5-3. The telecommunication system 1 also comprises a core network 8. As those skilled in the art will appreciate, whilst one mobile telephone 3 and three base stations 5 are shown in FIG. 1 for illustration purposes, the system, when implemented, will typically include other base stations and mobile telephones.

The base stations 5 are connected to each other via a so-called X2 interface, and to the core network 8 via an S1 interface. The core network 8 comprises, amongst other things, a mobility management entity (MME) 12, a serving gateway (SGW) 14 and a Packet Data Network (PDN) Gateway (PGW) 16.

As will be understood by those skilled in the art, each base station 5 operates one or more base station cells (not shown) in which communications can be made between the base station 5 and the mobile telephone 3. A user of the mobile telephone 3 can communicate with other users and/or remote servers via the base station 5 and the core network 8.

LTE Sub-Frame Data Structure

Before discussing the specific ways in which the mobile telephone 3 can communicate with the multiple transmission points, a brief description will be given of the access scheme and a general frame structure agreed for LTE communications. An Orthogonal Frequency Division Multiple Access (OFDMA) technique is used for the downlink to allow the mobile telephone 3 to receive data over the air interface with the base station 5. Different sub-carriers are allocated by the base station 5 (for a predetermined amount of time) to the mobile telephone 3 depending on the amount of data to be sent to the mobile telephone 3. These blocks of sub-carriers are referred to as physical resource blocks (PRBs) in the LTE specifications. PRBs thus have a time and frequency dimension. The base station 5 dynamically allocates PRBs for each device that it is serving and signals the allocations for each sub-frame (TTI) to each of the scheduled devices in a control channel.

Figure 2A:
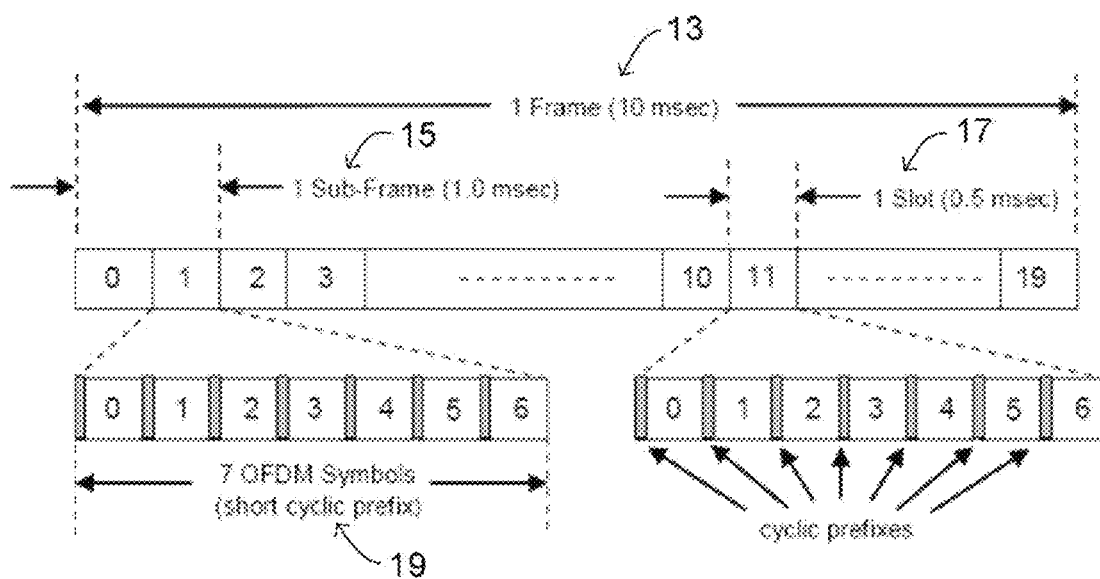
FIG. 2a illustrates a generic frame structure defined for use in the LTE communication network.
Figure 2B:
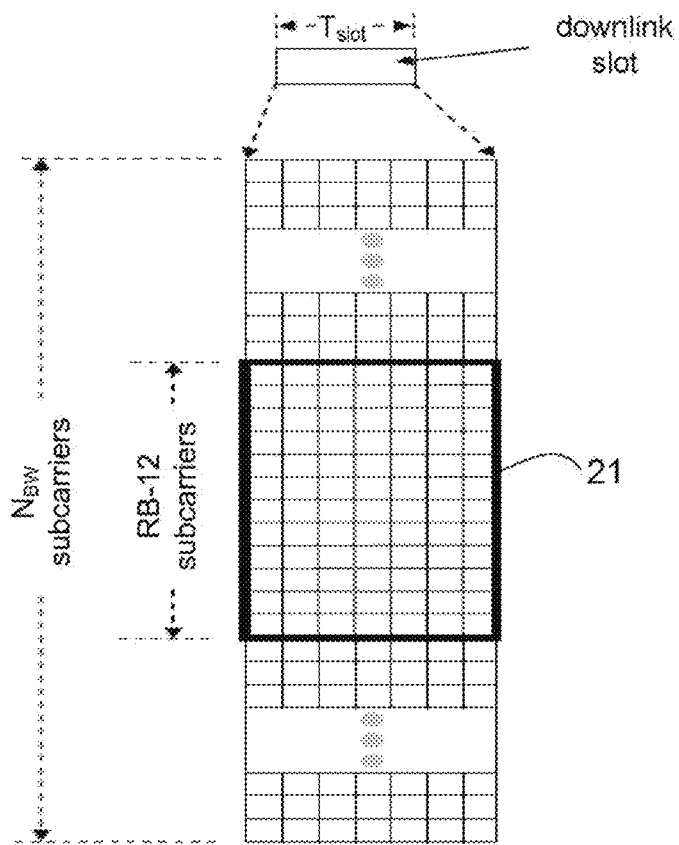
FIG. 2b illustrates the way in which a slot illustrated in FIG. 2a is formed of a number of time-frequency resources.

FIG. 2a illustrates one generic frame structure agreed for LTE communications over the air interface with the base station 5. As shown, one frame 13 is 10 msec long and comprises ten sub-frames 15 of 1 msec duration (known as a Transmission Time Interval (TTI)). Each sub-frame or TTI comprises two slots 17 of 0.5 ms duration. Each slot 17 comprises either six or seven OFDM symbols 19, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise 12 consecutive subcarriers for one slot 17 (although this could clearly be different). The transmitted downlink signal comprises $N_{BW}$ subcarriers for a duration of $N_{symb}$ OFDM symbols. It can be represented by a resource grid as illustrated in FIG. 2*b*. Each box in the grid represents a single sub-carrier for one symbol period and is referred to as a resource element (RE). As shown, each PRB 21 is formed from twelve consecutive sub-carriers and (in this case) seven symbols for each subcarrier; although in practice the same allocations are made in the second slot 17 of each sub-frame 15 as well.

In the case of carrier aggregation, multiple carriers are provided, each having the frame structure illustrated in FIGS. 2*a* and 2*b*, but separated in frequency so that they do not interfere.

Some of the resource elements are configured to carry the reference signals used for signal quality measurements. Similarly, some of the resource elements can be transmitted at zero power level for facilitating the above described interference measurements. The CSI process informs the mobile telephone 3 which resource elements of which carriers are currently configured to carry the NZP CSI-RS and ZP CSI-IM signals to be measured and reported.

In this embodiment, the base stations 5 are arranged to be able to communicate with the mobile telephone 3 as a number of coordinated transmission points. Optionally, one or more of the base stations 5 may be configured to provide aggregated component carriers. The transmission points (TPs)—the base stations 5 in the embodiments, co-operate together to co-ordinate their multi-point transmissions. Typically, different sets of co-ordinating transmission points will be provided within the communications system. A number of different multi-point transmission modes are possible, as follows:

1. Joint Transmission (JT). In this case the mobile telephone 3 receives transmissions from multiple transmission points (TPs) on a time-frequency resource (such as on a PRB on a sub-frame). These transmissions may be carrying the same data (such that the signals from each TP can be combined by the mobile telephone 3 and thereby improve the quality of the received signal) or different data (such that more data per time-frequency resource is sent to the mobile telephone 3) from the TPs.
2. Coordinated scheduling/beam forming (CS/CB). In this case the mobile telephone 3 receives transmissions from only one TP on any one time-frequency resource, and the TPs co-ordinate their scheduling and/or beam forming decisions to minimise interference between the transmissions. The transmitting points that are used are chosen semi-statically—such that they change relatively infrequently.
3. Dynamic Point Selection (DPS). In this case the mobile telephone 3 receives transmissions on a time-frequency resource from only one TP selected from the set of co-ordinating transmission points; but the selected TP may change rapidly (from one sub-frame to another) based on the instantaneous radio channel conditions between the mobile telephone 3 and the transmission points.

Depending on the number of transmission points, and whether any of the base stations 5 implement carrier aggregation functionality, there are a number of cells that need to be measured and reported by the mobile telephone 3 in order to assist the serving base station(s) 5 in optimising signal conditions within the cells of the communication system 1.

In this embodiment, the serving base station 5 (e.g. base station 5-1) configures the mobile telephone 3 to measure and report the CSI of a set of non-zero power CSI-RS resources (i.e. the CoMP measurement set). The mobile telephone 3 may also be configured with one or more interference measurements. Each interference measurement is associated with one CSI-interference measurement resource (IMR), which is a set of REs on which the mobile telephone 3 is instructed to measure interference.

As specified in the relevant 3GPP standards, a CSI process is identified by a CSI process index and a serving cell index. The serving cell index identifies the transmission point and a carrier (i.e. a cell of the base station 5 sending the CSI process to the mobile telephone 3) for which signal measurements (on NZP CSI-RS) and interference measurements (on ZP IMR) should be carried out by the mobile telephone 3. E-UTRAN configures at most five CSI processes across all serving cells (i.e. for up to five component carriers) in order to keep UE complexity and feedback overhead at a minimum.

However, in this proposal, one CSI process is advantageously associated with multiple carriers (i.e. multiple TPs and/or component carriers in case of CA) and multiple IMR configurations. In particular, rather than each base station 5 configuring one signal quality measurement and one interference measurement per CSI process (i.e. each base station configuring each CSI process for a single carrier only), in this embodiment, each CSI process can be associated with multiple transmission points and can specify multiple signal quality and interference measurements. This allows for an increase of the number of configurations without requiring an exchange of additional messages between the base stations 5 and the mobile telephone 3 to configure such additional measurements and also without an impact on the CoMP throughput performance gain. Increasing the number of configurations for the interference part of CSI can also improve the interference measurement accuracy and performance. On the other hand, if only five (or less) configurations are needed, it is possible to implement them using less signalling thus essentially saving system resources which then can be used to transmit e.g. user data.

When the mobile telephone 3 reports the results of the measurements to one of the CoMP transmission points, it identifies which measurement is being reported (rather than just identifying the CSI process). For example, the mobile telephone 3 may include in the CSI feedback, reporting information identifying the interference measurement that is being reported (e.g. an IMR ID) and/or an index of the combination of transmission point (or carrier) and IMR (TP/IMR index).

The benefit of this approach is that more measurements can be configured using the same amount of messages and it is also possible to configure measurements for multiple (or even all) CoMP transmission points (or carriers) by a single transmission point, in one message. Even when additional measurements are configured for (and carrier out by) the mobile telephone, since only the results of relevant measurements need to be reported (i.e. carriers on which the UE is experiencing low signal quality and/or high interference), the amount of information (and the number of messages) to be sent by the mobile telephone 3 does not increase (significantly) even when additional measurements have been configured. However, since more interference measurements can be configured and performed by the mobile telephone 3 compared to methods using a single IMR measurement per CSI process, the accuracy of measurements is likely to increase.

On the other hand, if the same amount of measurements are to be configured (i.e. up to five CSI processes as per current 3GPP requirements), it is possible to configure those measurements using fewer messages (even in a single message) thus reducing usage of the air interface resource between the base stations 5 and the mobile telephone 3.

Although not shown on FIG. 1, the telecommunication system 1 may also comprise one or more Remote Radio Heads (RRHs) and/or relay nodes (RNs) in addition to (or instead of any of) the base stations 5-1 to 5-3. If present, the main difference between 'regular' base stations 5-1 to 5-3 and any RRH or relay node is that RRHs and relay nodes are not connected to the core network 8 directly. Instead, the RRH is typically connected to a master (or 'donor') base station by a high speed communication link whilst relay nodes are typically connected to a donor base station via an air interface. The RRH and the RN may either act just like a remote antenna of the base station such that the signals broadcast by the RRH/RN are the same as those broadcast by its donor base station (e.g. the RRH/RN may use the same cell ID as the 'donor' base station's cell) or may act as a base station itself serving user equipment within its own cell (which in this case may have a different cell ID to that of the cell of the 'donor' base station).

CoMP transmission schemes can be generally classified to belong to one (or a combination) of the following four main scenarios:
1. Homogeneous network with intra-site (i.e. intra base station) CoMP;
2. Homogeneous network with high transmit (Tx) power Remote Radio Heads (RRHs);
3. Heterogeneous network with low power RRHs within the coverage area of a macrocell (e.g. a base station cell) where the transmission/reception points created by the RRHs have different cell identities than the macro cell; and
4. Heterogeneous network with low power RRHs within the coverage area of macrocell (e.g. a base station cell) where the transmission/reception points created by the RRHs have the same cell identity as the macro cell.

FIGS. 3a to 3c schematically illustrate examples of the main CoMP transmission scenarios for the provision of multiple, coordinated network transmission points.

FIG. 3a shows an example for implementing a homogeneous network with intra-site CoMP (scenario 1). In this case, the middle base station may be configured to perform coordination of multi-point transmissions (by this and any neighbouring base stations) within the geographical area defined by the coordinating base station's cells. When transmissions are coordinated between neighbouring base stations, throughput and/or signal quality along the common cell edge can be improved.

FIG. 3b shows an example for implementing a homogeneous network with high Tx power RRHs, controlled by a single base station (scenario 2). In this case, the remote radio heads are connected to the master base station (shown in the middle) via high-speed optical fiber links. Such arrangement allows the master base station to perform coordination of multi-point transmissions even beyond the geographical area of its cells.

FIG. 3c shows an example for implementing either one of scenario 3 or 4 above. In this case, a heterogeneous network is shown with low power RRHs within the coverage area of a macrocell (e.g. a master base station cell). The transmission/reception points created by the RRHs may have different cell identities than the macro cell (scenario 3) or have the same cell identity as the macro cell (scenario 4). The remote radio heads are connected to the master base station (shown in the middle) via high-speed optical fiber links, as above. However, in these scenarios, rather than extending the coordinated geographical area as above, the number of radio cells (and hence the available bandwidth) within the geographical area of the master base station's cell(s) is multiplied.

Relay nodes can be deployed and used to provide additional coverage and/or additional transmission points in generally the same manner as the RRHs shown in FIG. 3b. However, relay nodes are typically connected to their respective master base stations (called 'donor base stations') using a wireless link (an air interface) rather than an optical fiber link.

Base Station

Figure 4:
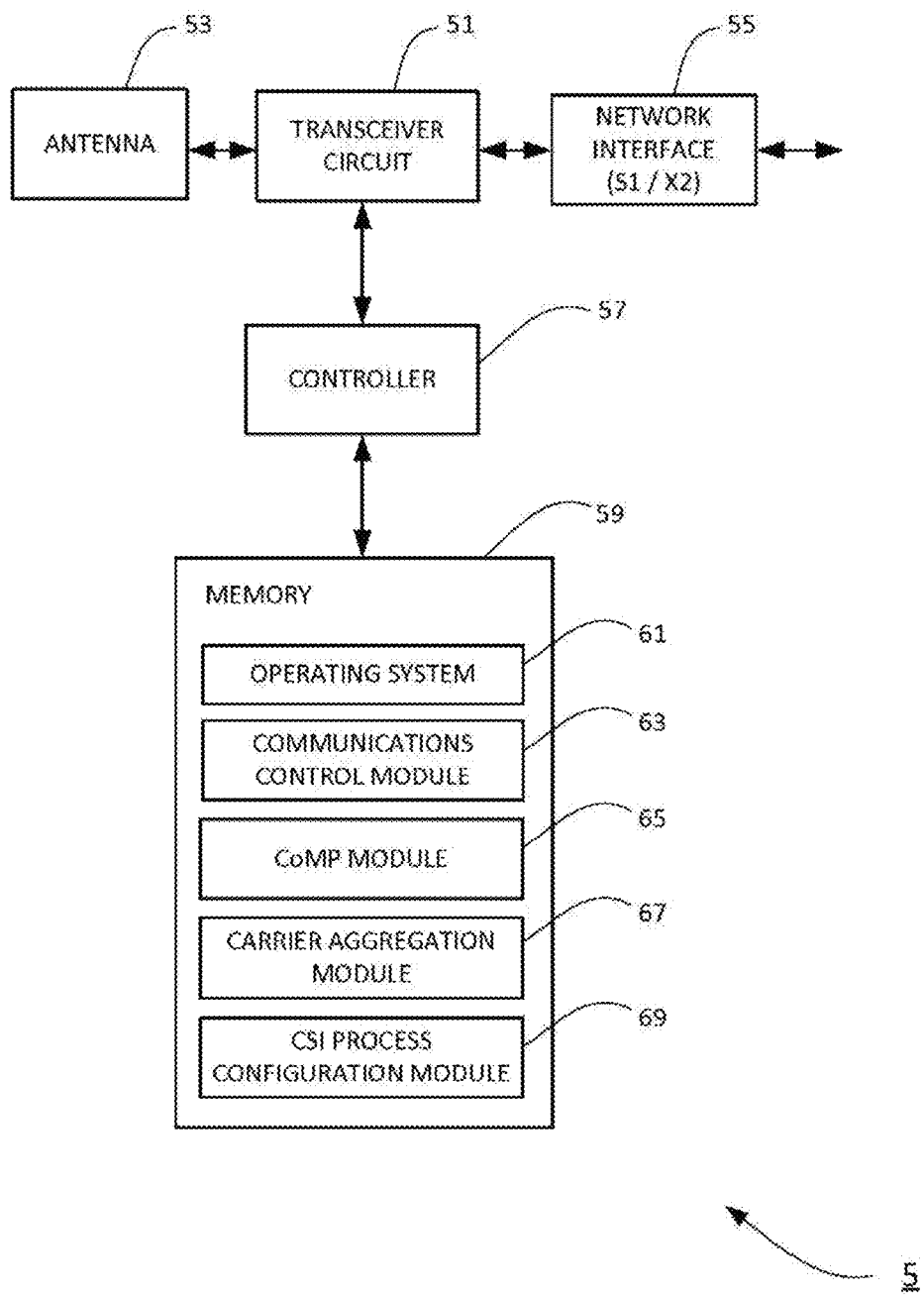
FIG. 4 is a block diagram illustrating the main components of the base station forming part of the system shown in FIG. 1.

FIG. 4 is a block diagram illustrating the main components of a base station 5 shown in FIG. 1. The base station 5 is a communications node providing services to user equipment 3 within its coverage area. In the embodiments according to the invention, communications between the various base stations 5 and the user equipment 3 are coordinated. As shown, the base station 5 includes a transceiver circuit 51 which transmits signals to, and receives signals from, the mobile telephone 3 via at least one antenna 53. The base station 5 also transmits signals to and receives signals from the core network 8 and other neighbouring base stations 5 via a network interface 55 (X2 interface for communicating with neighbouring base stations 5 and S1 interface for communicating with the core network 8). The operation of the transceiver circuit 51 is controlled by a controller 57 in accordance with software stored in memory 59. The software includes, among other things, an operating system 61, a communications control module 63, a CoMP module 65, a carrier aggregation module 67, and a CSI process configuration module 69.

The communications control module 63 is operable to control communications between the base station 5 and the mobile telephone 3, and the core network devices.

The CoMP module 65 is operable to coordinate multi-point transmissions between the cell(s) of this base station 5 and the mobile telephone 3 served by this base station (and any further base station). The CoMP module 65 may communicate with corresponding modules of other base stations to ensure that coordination is maintained between the various base stations and may also assist the communications control module 63 to carry out control of communications using CoMP services.

The carrier aggregation module 67 is operable to set up and maintain aggregated carriers (i.e. primary and secondary component carriers) for communications between the cells of this base station 5 and the mobile telephones 3 served by the base station 5.

The CSI process configuration module 69 is operable to configure signal quality indication and interference related measurements and reporting for the mobile telephones 3 served by this base station 5. The CSI process configuration module 69 is also operable to monitor (e.g. via the CoMP module 65 and the carrier aggregation module 67) whether or not any cell of the base station 5 is involved in provision of CoMP and/or CA services, and to configure CSI processes for the mobile telephones 3 accordingly.

Mobile Telephone

Figure 5:
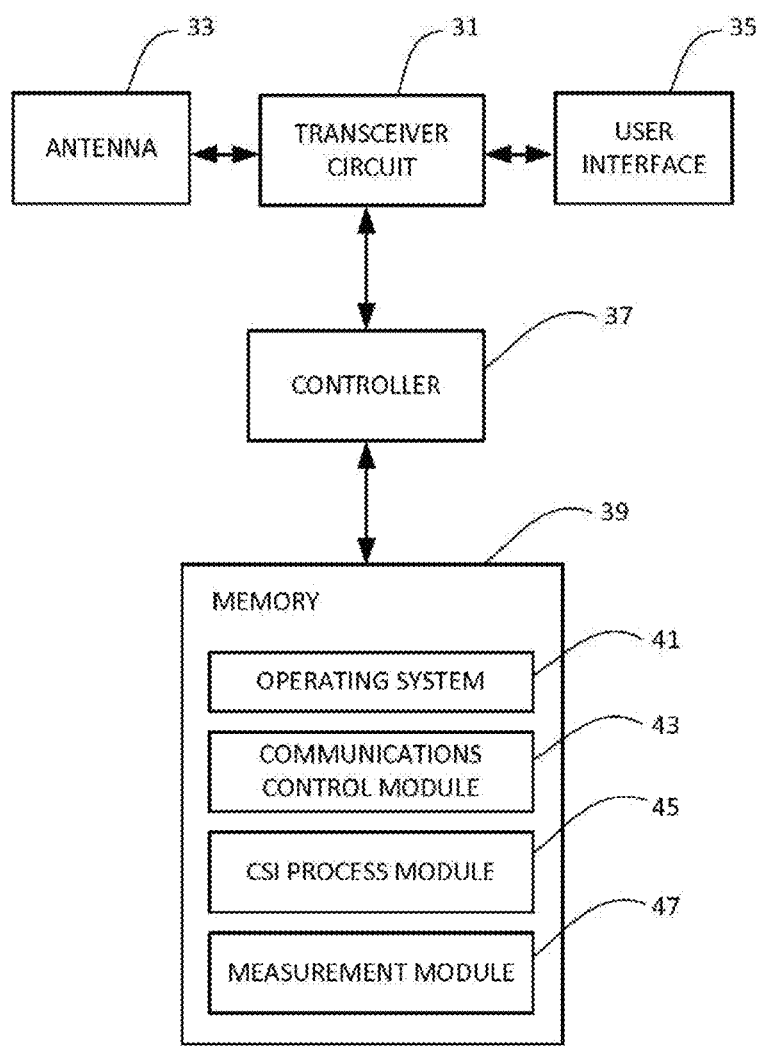
FIG. 5 is a block diagram illustrating the main components of a mobile telephone forming part of the system shown in FIG. 1.

FIG. 5 is a block diagram illustrating the main components of the mobile telephone 3 shown in FIG. 1. As shown, the mobile telephone 3 has a transceiver circuit 31 that is operable to transmit signals to and to receive signals from a base station 5 via one or more antenna 33. The mobile telephone 3 has a controller 37 to control the operation of the mobile telephone 3. The controller 37 is associated with a memory 39 and is coupled to the transceiver circuit 31. Although not necessarily shown in FIG. 5, the mobile telephone 3 may of course have all the usual functionality of a conventional mobile telephone 3 (such as a user interface 35) and this may be provided by any one or any combination of hardware, software and firmware, as appropriate. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, a CSI process module 45, and a measurement module 47.

The communications control module 43 is operable to control the communication between the mobile telephone 3 and the base station(s) 5. The communications control module 43 also controls the separate flows of uplink data and control data that are to be transmitted to the base station 5. When CA services are in use, the communications control module 43 is operable to control communications via the aggregated primary and secondary component carriers. When CoMP services are in use, the communications control module 43 is operable to control coordinated communications between the mobile telephone 3 and the multiple transmission points.

The CSI process module 45 is operable to receive and enforce configurations for signal quality indication and interference related measurements and reporting to assist the serving base station(s) 5. The CSI process module 45 is operable to communicate with the corresponding module (i.e. the CSI process configuration module 69) of the base station 5.

The measurement module 47 is operable to carry out signal measurements to determine an indication of signal quality/interference experienced by the mobile telephone 3. The measurement module 47 is also operable to provide the results of such measurements to the serving base station(s) 5 (via the CSI process module 45 and the transceiver circuit 31).

In the above description, the mobile telephone 3 and the base station 5 are described for ease of understanding as having a number of discrete modules (such as the communications control modules, the CoMP module, and the measurement module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different embodiments will now be described that illustrate how the invention can be put into effect using the mobile telephone 3 and base stations 5 (as exemplary transmission points) of FIG. 1.

Operation—CSI Association with Multiple TP and IMR Configurations

In this embodiment, the mobile telephone 3 is configured to measure interference on an IMR whilst the base station 5 (the one that is considered to be the interfering TP under that hypothesis) transmits data symbols on those IMR REs. Within the CoMP coordinating TPs, it is also possible for the network to transmit non-PDSCH (i.e. non-data) signals on the IMR REs used by the mobile telephone 3 for interference measurement to generate a precise interference scenario (PDSCH stands for Physical Downlink Shared Channel, i.e. the main downlink data-bearing channel in LTE).

Channel Quality Indication (CQI) comprises information signalled by the mobile telephone 3 to the serving base station 5 to indicate a suitable data rate (typically a Modulation and Coding Scheme (MCS) value) for downlink transmissions. CQI is usually based on a measurement of the received downlink Signal to Interference plus Noise Ratio (SINR) and information about the mobile telephone's 3 receiver characteristics. Further details about the CQI can be found in 3GPP TS 36.213, section 7.2.3.

CQI reporting is an important element of LTE and has significant impact on the system performance. There are two types of CQI reports in LTE: periodic and aperiodic. The periodic CQI report is carried by either the Physical Uplink Control Channel (PUCCH) or the Physical Uplink Shared Channel (PUSCH), depending on whether or not the mobile telephone 3 has uplink data to send in the same subframe as the scheduled periodic CQI report. The aperiodic CQI report, which may be used to provide a more granular measurement than the periodic one, is transmitted on the PUSCH.

The granularity of the CQI report can be divided into three levels: wideband, UE selected subband, and higher layer configured subband. The wideband report provides one CQI value for the entire downlink system bandwidth. The UE selected subband CQI report divides the system bandwidth into multiple subbands, then reports one CQI value for the wideband and one differential CQI value for a set of subbands selected (i.e. preferred) by the mobile telephone 3. The higher layer configured subband report divides the entire system bandwidth into multiple subbands, then reports one wideband CQI value and multiple differential CQI values, one for each subband. This report provides the highest granularity.

PMI (Precoding Matrix Indicator) and RI (Rank Indication) may also be reported by the mobile telephone 3 together with the CQI report. PMI indicates the codebook (pre-agreed parameters) the base station 5 should use for data transmission over its multiple antennas 53 based on an evaluation of a received reference signal (e.g. RSRP). RI indicates the number of spatial transmission layers that the mobile telephone 3 can distinguish. Spatial multiplexing can be supported only when RI>1. For spatial multiplexing, CQI is reported per codeword.

In order to obtain accurate CQI feedback at the serving base station 5, the mobile telephone 3 needs to send multiple CQI reports with different interference hypothesis for the serving TP (e.g. base station 5-1) and for cooperating TPs (e.g. base stations 5-2 and 5-3) resulting in a significant feedback overhead. Therefore, CQI reports are typically sent every few milliseconds (approximately every 5-10 ms for voice traffic, and possibly more often for other types of traffic) and for each transmission point (e.g. all of base stations 5-1 to 5-3 and for all component carriers in case of CA). However, too frequent CQI reporting is wasteful of air interface resources that would otherwise be used to transmit user data. Consequently, the more CQI feedback is sent, the less user data can be transmitted over the air interface (although signal quality may improve).

As shown in Table 1, each CSI process includes one NZP CSI-RS and one IMR for each TP, hence four CQI feedback reports per component carrier for a CoMP scenario with three TPs would be sent every 5-10 ms. However, for a specific CoMP scheme, such as DPS, DPB or JT, the CoMP scheduler (i.e. the CoMP module 65) of the base station 5 would only need to know the full CSI information of one or two of these CSI processes, e.g. the best one or two of the CSI processes #1, #2, and #3 shown in Table 1. Consequently, the mobile telephone 3 does not need to send all four possible CQI feedback reports, only the most relevant ones. The mobile telephone 3 may include in its CQI feedback report the CQI value(s) for the subband measurement, the wideband measurement, or both.

TABLE 1 existing configuration of CSI processes
(3 TPs, e.g. base stations 5-1, 5-2, and 5-3 of FIG. 1)

| | Signal part (NZP CSI-RS) | Interference Part (ZP CSI-RS) | IMR Description |
|---|---|---|---|
| CSI process #0 | TP #1 | IMR #1 | Interference outside cooperating set TP1, TP2 and TP3 are muted (OFF) |
| CSI process #1 | TP #1 | IMR #2 | Muting on TP1 (OFF) TP2 ON, TP3 ON |
| CSI process #2 | TP #2 | IMR #3 | Muting on TP2 (OFF) TP1 ON, TP3 ON |
| CSI process #3 | TP #3 | IMR #4 | Muting on TP3 (OFF) TP1 ON, TP2 ON |

In this embodiment, in order to achieve more accurate CQI per TP for CoMP feedback without increasing the number of CSI reporting, a single CSI process (i.e. a CSI process set) is associated with multiple TPs and this single CSI process includes multiple instances of NZP CSI-RS and multiple instances of IMR where each NZP CSI-RS instance is linked to one TP and each IMR instance could be linked to one or more TPs.

This scheme can advantageously facilitate vendor specific precoding optimisation schemes at the transmission point without requiring the mobile telephone 3 to be aware of the precise precoding matrix. This is particularly useful in scenarios where UE specific elevation beamforming is required as in the case of some urban scenarios for Release-12 (e.g. such urban scenarios may include a mixture of skyscrapers, office buildings and residential buildings, with some mobile telephones 3 being located at ground level and others distributed at various heights in the buildings).

Table 2 shows an example of the new CSI process configurations for a mobile telephone 3 in the case of two transmission points. CSI process #0 and CSI process #1 are designed for this purpose. In this example, TP2 (e.g. base station 5-2) is transmitting (with some random weights) using Rank Indicator (RI) set to 1 and Precoding Matrix Indicator (PMI) set to 1, i.e. RI1/PMI-1, on IMR #1 and using RI set to 1 and PMI set to 2, i.e. RI1/PMI-2, on IMR #2.
(The reader is referred to 3GPP TS 36.213 Section 7.2 and 7.2.4 for further details of what the RI and PMI are used for.)

The mobile telephone 3 only has to perform interference measurements on the configured IMR REs. If only a single TP is configured for a given CSI process, the mobile telephone 3 may send back the best CQI report in the CSI process plus the corresponding IMR ID with the lowest measured interference (i.e. either IMR #1 or IMR #2 for CSI process #0, and either IMR #3 or IMR #4 for CSI process #1 of this example), i.e. the PMI that causes the least interference to the reporting mobile telephone 3.

TABLE 2 exemplary configuration of CSI processes
(2 TPs, e.g. base stations 5-1 and 5-2 of FIG. 1)

| | Signal Part (NZP CSI-RS) | Interference Part (ZP CSI-RS) | IMR Description |
|---|---|---|---|
| CSI process #0 | TP #1 | IMR #1 | Muting is on TP1 and TP2 is transmitting at RI1/PMI-1 (CS/CB or DPS) |
| | TP #1 | IMR #2 | Muting is on TP1 and TP2 is transmitting at RI1/PMI-2 (CS/CB or DPS) |
| CSI process #1 | TP #2 | IMR #3 | Muting is on TP2 and TP1 is transmitting at RI2/PMI-3 (CS/CB or DPS) |
| | TP #2 | IMR #4 | Muting is on TP2 and TP1 is transmitting at RI2/PMI-4 (CS/CB or DPS) |

The primary use case of this scheme is for CQI feedback overhead reduction and to support CoMP across multiple component carriers. Although this approach requires the mobile telephone 3 to compute several hypothesis in each CSI process, the complexity of the mobile telephone 3 is not affected because it is required to carry out the same number of computations regardless of whether several hypotheses are defined in one process (as in this embodiment) or only one hypothesis is defined per CSI process but there are separate CSI processes for each TPs (i.e. in case each CSI process includes one configuration only). Beneficially, it is also possible to re-use the PMI value within a particular CSI process among hypotheses that share the same NZP part so that the common measurements do not have to be repeated for each hypothesis (because in this case each hypothesis within any CSI process measures the same NZP reference signal and hence it is likely to give the same result). This can be achieved by configuring an RI/PMI reference process. In this context, the reference process refers to the reference PMI/RI values used for the NZP signal part, not the interference part (i.e. IMR part) shown in Table 2.

One possible way is to re-use the Release-11 RI/PMI reference process, which can be configured for a dependent CSI process. A dependent CSI process is expected to be configured to use the same set of restricted RIs and/or PMIs with codebook subset restriction as the reference CSI process. As long as the total number of hypotheses remains the same, the complexity remains fixed and with re-use of PMI within a process complexity of the mobile telephone 3 can be further limited.

For a given set of hypotheses (where 'hypothesis' means one combination of TP and IMR), the present proposal reduces reporting overhead (whilst it does not change measurement complexity). As illustrated by the two examples below, the present proposal (denoted 'Case 2') achieves a lower reporting overhead than existing methods (denoted 'Case 1') with the same (or possibly reduced) measurement complexity.

| CSIProcess | TP | IMR |
|---|---|---|
| CASE 1 (legacy, 4 CSI processes, 4 hypotheses) | | |
| 0 | #1 | #1 |
| 1 | #1 | #2 |
| 2 | #2 | #3 |
| 3 | #2 | #4 |
| CASE 2 (this proposal, 2 CSI processes, 4 hypotheses) | | |
| 0 | #1 | #1 |
|  | #1 | #2 |
| 1 | #2 | #3 |
|  | #2 | #4 |

Table 3 shows an example of a modified CSI process configuration for a mobile telephone 3 in communication with three transmission points (e.g. base stations 5-1 to 5-3), each operating two cells (two component carriers, CCs, possibly using carrier aggregation as well). In this case, multiple NZP CSI-RS and multiple IMRs are configured for each CSI process and each IMR is linked to multiple TPs. However, despite the relatively high number of configured measurements, the mobile telephone 3 only needs to feedback a single CQI report for each CSI process. Advantageously, the mobile telephone 3 sends back the highest CQI report and the corresponding index of the TP/IMR ID combination.

TABLE 3 exemplary configuration of CSI processes
(3 TPs, e.g. base stations 5-1, 5-2, and 5-3 of FIG. 1)

| | Signal part (NZP CSI-RS) | Interference Part (ZP CSI-RS) | IMR Description |
|---|---|---|---|
| CSI process #0 | TP#1, CC0 | IMR#1 | Interference outside cooperating set TP1, TP2 and TP3 are muted (OFF) on Component Carrier 0 |
| | TP #2, CC0 | IMR #1 | Interference outside cooperating set TP1, TP2 and TP3 are muted (OFF) on Component Carrier 0 |
| | TP #3, CC0 | IMR #1 | Interference outside cooperating set TP1, TP2 and TP3 are muted (OFF) on Component Carrier 0 |
| CSI process #1 | TP #1, CC1 | IMR #2 | Interference outside cooperating set TP1, TP2 and TP3 are muted (OFF) on Component Carrier 1 |
| | TP #2, CC1 | IMR #2 | Interference outside cooperating set TP1, TP2 and TP3 are muted (OFF) on Component Carrier 1 |
| | TP #3, CC1 | IMR #2 | Interference outside cooperating set TP1, TP2 and TP3 are muted (OFF) on Component Carrier 1 |

For any number of coordinated transmission points, the CSI processes may be defined as follows:

```
CSI-Process-r12:
{
    CSI-Process-ID      Integer
    NZP-CSI-RS-ID       Multiple Instances
    CSI-IM-ID           Multiple Instances
    ...
}
```

In the above embodiments, each IMR can be configured independently e.g. with an R10 'subframeConfig' and an R10 'resourceConfig', where 'resourceConfig' is for four REs/PRB.

The benefit of the proposal is that accurate per TP CQI for CoMP feedback can be achieved without increasing the number of CSI reporting signalling. The only additional data to be exchanged is the index of the selected IMR, i.e. approximately 2-3 bits of data.

An alternative to the above proposal would be to increase the number of CSI processes according to the number of transmission points/component carriers. However, given the definition of CSI process and CQI feedback currently used in Rel-11, this would result in significantly larger feedback overhead and increased UE processing complexity.

Operation—CSI-IMR Measurement and Configuration

The current version of the 3 GPP TS 36.213 standard (v11.1.0) specifies CQI as follows: "Based on an unrestricted observation interval in time and frequency, the UE shall derive for each CQI value reported in uplink subframe n the highest CQI index between 1 and 15".

However, the standard does not specify which CSI-IM REs may be used or how many IMRs may be used. The set of CSI-IM REs to use for an interference estimate is currently not specified by 3GPP. Based on the contents of 3GPP document no. R1-125370, the following observations can be made:

the mobile telephone 3 may employ excessive time domain averaging;
it is not clear how much averaging in frequency is allowed; and
the absence of RANI guidance on interference leads to inconsistent UE behaviour and performance loss.

Further, in 3GPP document no. R1-125051 the following observations are made:

averaging in time can also degrade the estimation performance; and
averaging interference over multiple IMRs may significantly increase the CQI error.

The proposed scheme agrees with the existing requirements for CSI-IMR RE configuration, i.e. that the IMR measurements for a single CSI process shall be as close to each other as possible (i.e. a 'time domain requirement') and that the measurement of the interference part should be within the subband of the signal part (i.e. a 'frequency domain requirement').

The additional IMRs may be configured only on (UE and/or network) selected subbands and the selected TP/IMR index may only need to be sent whenever there are changes to the selected TP and/or IMR ID.

The density of the IMR configuration can be reconfigured or reduced in frequency domain, e.g. within certain selected sub-band. This allows to achieve a reduction of measurement complexity by reducing the number of IMR measurement to be performed in the frequency domain.

Figure 6:
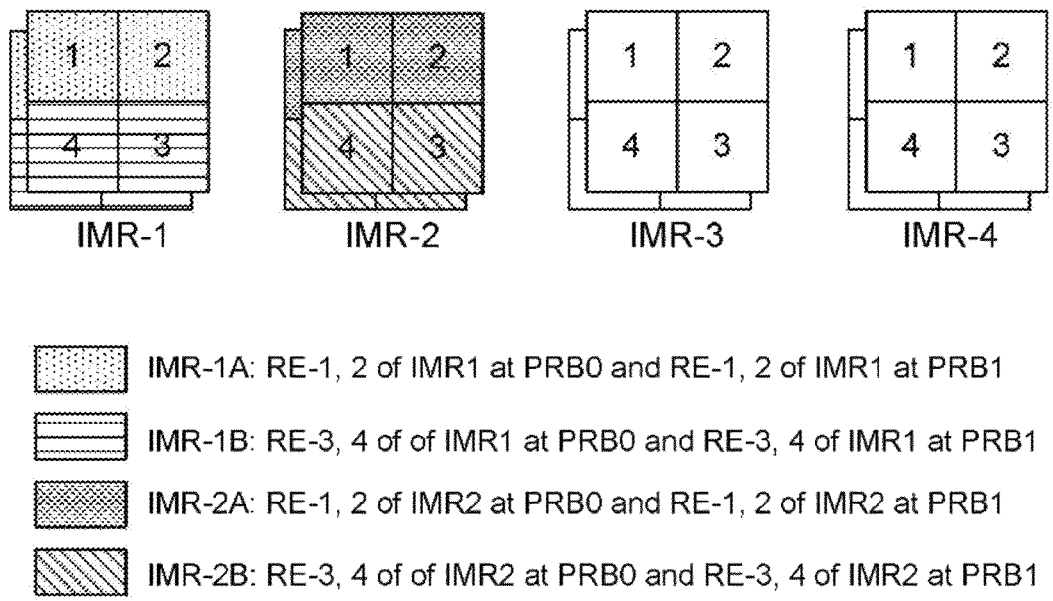
FIG. 6 illustrates an exemplary IMR configuration according to an embodiment of the present invention.

FIG. 6 illustrates an example where each IMR utilizes four REs from two PRBs, e.g. IMR-1A uses two REs from PRB0 and two additional REs from PRB1. In this embodiment, in accordance with section 7.2.6 of 3GPP TS 36.213 (v11.2.0), the mobile telephone is configured with four CSI-IM resource configurations.

In particular, the following parameters are configured (e.g. using higher layer signalling, e.g. RRC signalling) for each CSI-IM resource configuration:

Zero-power CSI RS Configuration (as defined in Table 6.10.5.2-1 and Table 6.10.5.2-2 of 3 GPP TS 36.211 (V11.2.0)); and Zero-power CSI RS subframe configuration (as defined in section 6.10.5.3 of 3 GPP TS 36.211 (V11.2.0)).

SUMMARY

In summary, with the embodiments described above, the number of configurable interference hypothesis was increased without increasing the number of CQI feedback reporting. Each CSI process may be associated with multiple serving TPs and multiple IMR configurations with single CQI feedback indicating the corresponding IMR ID with the highest CQI and/or PMI that causes least interference to the reporting mobile telephone 3.

Figure 7:
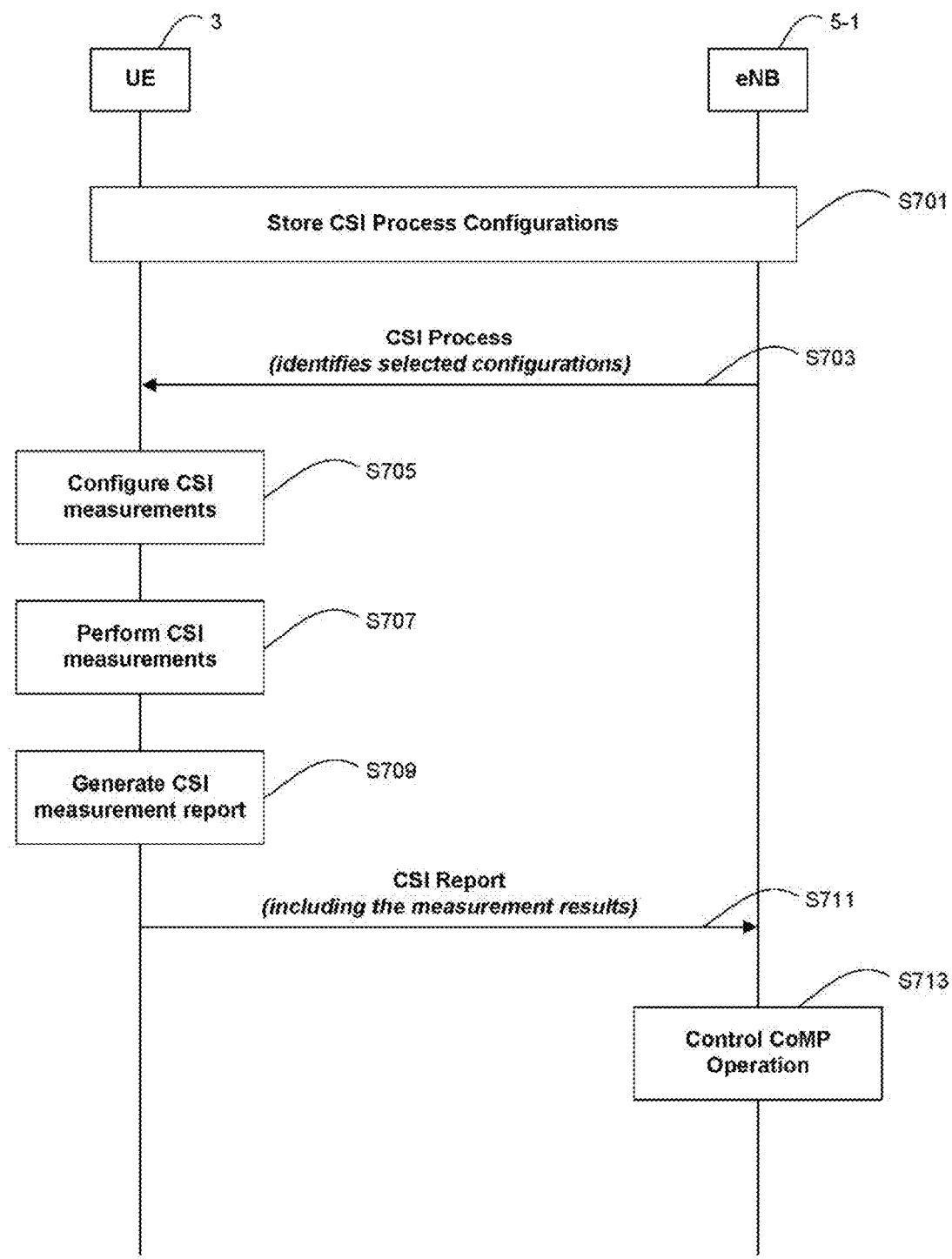
FIG. 7 is an exemplary timing diagram illustrating a method performed by components of the mobile telecommunication system of FIG. 1 whilst carrying out an embodiment of the invention.

FIG. 7 shows an example timing diagram illustrating a method performed by components of the telecommunication system 1 when configuring and performing signal quality and interference related measurements and reporting.

The process begins in step S701, in which the base station 5-1 provides information relating to the possible CSI process configurations to the mobile telephone 3. The CSI process configurations, including the IMR configuration, are configured by higher layer (e.g. RRC layer) signalling. However, in this embodiment, the mobile telephone 3 only reports the hypothesis with the best (one or two) CQI report within each CSI process rather than all of them. Therefore, the base station 5-1 includes in the CSI process configurations, data identifying each respective hypothesis (measurement configuration). For example, a hypothesis may be identified using an index of the transmission points (i.e. a 'TP index') and/or an index of the corresponding interference measurement resources (i.e. an 'IMR index'). When the mobile telephone 3 subsequently reports the measurement results (e.g. the best CQI report) for a particular CSI process, the IMR index alone (or in combination with the TP index) may be sufficient to uniquely identify which measurement configuration (hypothesis) each result relates to. However, a particular hypothesis may be identified by other methods, e.g. using the CSI index in combination with the TP index and/or the IMR index as long as the base station 5-1 and the mobile telephone 3 agree on the method used.

At the end of step S701, the measurement configurations (including the data identifying each respective hypothesis) are available to the respective modules of the mobile telephone 3 (stored in memory 39) and the base station 5-1 (stored in memory 59).

In step S703, the CSI process configuration module 69 generates and sends (via the transceiver circuit 51) a 'CSI Process' request message to the corresponding module (CSI process module 45) of the mobile telephone 3. This message requests the mobile telephone 3 to perform signal quality and interference measurements and reporting for CoMP services. It does this by including in this message data identifying the CSI process configurations to be used during the measurements, such as an identification of the CSI process, an identification of the resource elements to be measured to obtain a measure of signal quality (of a given TP), and/or an identification of the IMR(s) to be measured as part of that CSI process.

In response to receiving the CSI process message, the mobile telephone 3 configures, in step S705, its measurement module 47 in accordance with the received configuration data and starts monitoring signal conditions as defined therein.

In step S707, the measurement module 47 performs the necessary cell measurements (CSI measurements) in respect of the resource elements identified in the received configuration data (i.e. it measures NZP RS resource elements in order to obtain a measure of signal quality and it measures ZP resource elements in order to obtain a measure of interference). Once the measurements are completed, in step S709, the CSI process module 45 generates a CSI measurement report, e.g. as prescribed by the 'CSI Process' request message received at step S703 and/or in accordance with the specific CoMP scheme being used.

In step S711, the CSI process module 45 sends the generated CSI measurement report (via the transceiver circuit 31) to the base station 5-1 in a CSI report message. This measurement report includes the results of only those measurements (e.g. one or more CQI value(s)), performed in step S707, that are considered relevant for the specific CoMP scheme being used. The measurement report also identifies the corresponding hypothesis for each measurement result being reported using the agreed identification method for that CSI process, e.g. TP and/or IMR index. The measurements and the associated reporting procedure (i.e. steps S707 to S711) may be repeated periodically if it has been requested to do so in the preceding CSI process message. Therefore, a single message at step S703 may trigger multiple, periodic CSI Reports (i.e. step S711 may comprise multiple and/or periodically sent messages). For example, a new CSI report may be generated and sent when a certain amount of time has passed (or a prescribed number of sub-frames have been transmitted) since sending a preceding CSI report and/or whenever the results of the relevant measurements are different to the results informed in a preceding CSI report.

After it has received the results of the relevant measurements and verified which measurement configuration they relate to (using the data stored in its memory 59), the base station 5-1 is operable to control the operation of the CoMP service (as generally shown at S713) in accordance with the received results. For example, the base station 5-1 may adjust its transmissions to reduce or eliminate any indicated interference. Furthermore, the base station 5-1 may also inform the other cooperating transmission points (e.g. base stations 5-2 and 5-3) if they need to adjust their transmissions in order to achieve better CoMP performance. The base station 5-1 may either forward the CSI measurement results to the other transmission points or forward only those parts of the CSI measurement results that are relevant to those transmission points. Alternatively, the base station 5-1 may provide the required operating parameters for the other transmission points, thereby effectively acting as a master base station which controls the operation of other CoMP transmission points as well.

Modifications and Alternatives

Detailed embodiments have been described above. As those skilled in the art will appreciate, a number of modifications and alternatives can be made to the above embodiments whilst still benefiting from the inventions embodied therein.

In the above embodiments, the base stations (or RRHs/RNs) are described as transmission points. However, the term 'transmission point' shall not be construed as being limited to network nodes that are actually transmitting user data to CoMP enabled mobile telephones—they may only transmit control data, such as reference signals and the like.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the base stations will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

This application is based upon and claims the benefit of priority from United Kingdom patent application No. 1306100.7, filed on Apr. 4, 2013, the disclosure of which is incorporated herein in its entirety by reference.

The invention claimed is:

1. A method performed by a user equipment (UE) for a communication network, the method comprising:
   receiving, from the communication network, a radio resource control (RRC) message including configuration information, wherein the configuration information comprises:
      an identifier;
      a channel state information reference signal (CSI-RS) information element that represents a plurality of CSI-RS resource configurations for reporting a CSI; and
      a channel state information interference measurement (CSI-IM) information element that represents at least one CSI-IM resource configuration for the reporting of the CSI,
      wherein the identifier corresponds to both the plurality of CSI-RS resource configurations and the least one CSI-IM resource configuration;
   receiving, from the communication network, a request associated with the configuration information; and
   transmitting, to the communication network, a CSI corresponding to the request.

2. The method according to claim 1, wherein each of the plurality of CSI-RS resource configurations is associated with a respective CSI-IM resource configuration.

3. The method according to claim 1, wherein the reporting the CSI is aperiodic reporting.

4. A user equipment (UE) for a communication network, the UE comprising:
   a receiver configured to:
   receive, from the communication network, a radio resource control (RRC) message including configuration information, wherein the configuration information comprises:
      an identifier;
      a channel state information reference signal (CSI-RS) information element that represents a plurality of CSI-RS resource configurations for reporting a CSI; and
      a channel state information interference measurement (CSI-IM) information element that represents at least one CSI-IM resource configuration for the reporting of the CSI,
      wherein the identifier corresponds to both the plurality of CSI-RS resource configurations and the least one CSI-IM resource configuration,
   receive, from the communication network, a request associated with the configuration information; and
   a transmitter configured to transmit, to the communication network, a CSI corresponding to the request.

5. The UE according to claim 3, wherein each of the plurality of CSI-RS resource configurations is associated with a respective CSI-IM resource configuration.

6. The method according to claim 1, wherein the transmitter is further configured to transmit the CSI by aperiodic reporting.

7. The method according to the claim 1, wherein the request is transmitted separately from the message of RRC.

8. A method performed by a base station comprising:
   transmitting, to a user equipment (UE), a radio resource control (RRC) message including configuration information, wherein the configuration information comprises:
      an identifier,
      a channel state information reference signal (CSI-RS) information element that represents a plurality of CSI-RS resource configurations for reporting a CSI, and
      a channel state information interference measurement (CSI-IM) information element that represents at least one CSI-IM resource configuration for the reporting the CSI,
      wherein the identifier corresponds to both the plurality of CSI-RS resource configurations and the least one CSI-IM resource configuration,
   transmitting, to the UE, a request corresponding to the configuration information; and
   receiving, from the UE, a CSI corresponding to the request.

9. The method according to claim 8, wherein each of the plurality of CSI-RS resource configurations is associated with a respective CSI-IM resource configuration.

10. The method according to claim 8, wherein the reporting the CSI is aperiodic reporting.

11. The method according to the claim 8, wherein the request is transmitted separately from the message of RRC.

12. A base station comprising:
   a transmitter configured to:
   transmit, to a user equipment (UE), a radio resource control (RRC) message including configuration information, wherein the configuration information comprises:
      an identifier,
      a channel state information reference signal (CSI-RS) information element that represents a plurality of CSI-RS resource configurations for reporting a CSI, and
      a channel state information interference measurement (CSI-IM) information element that represents at least one CSI-IM resource configuration for the reporting the CSI,
      wherein the identifier corresponds to both the plurality of CSI-RS resource configurations and the least one CSI-IM resource configuration,
   transmit, to the UE, a request corresponding to the configuration information; and a receiver configured to receive, from the UE, a CSI corresponding to the request.

13. The base station according to claim 12, wherein each of the plurality of CSI-RS configurations is associated with a respective CSI-IM resource configuration.

14. The base station according to claim 12, wherein the reporting the CSI is aperiodic reporting.

15. The base station according to the claim 12, wherein the request is transmitted separately from the message of RRC.

16. The method according to the claim 1, wherein the request is transmitted separately from the message of RRC.

* * * * *